Patented Sept. 29, 1953

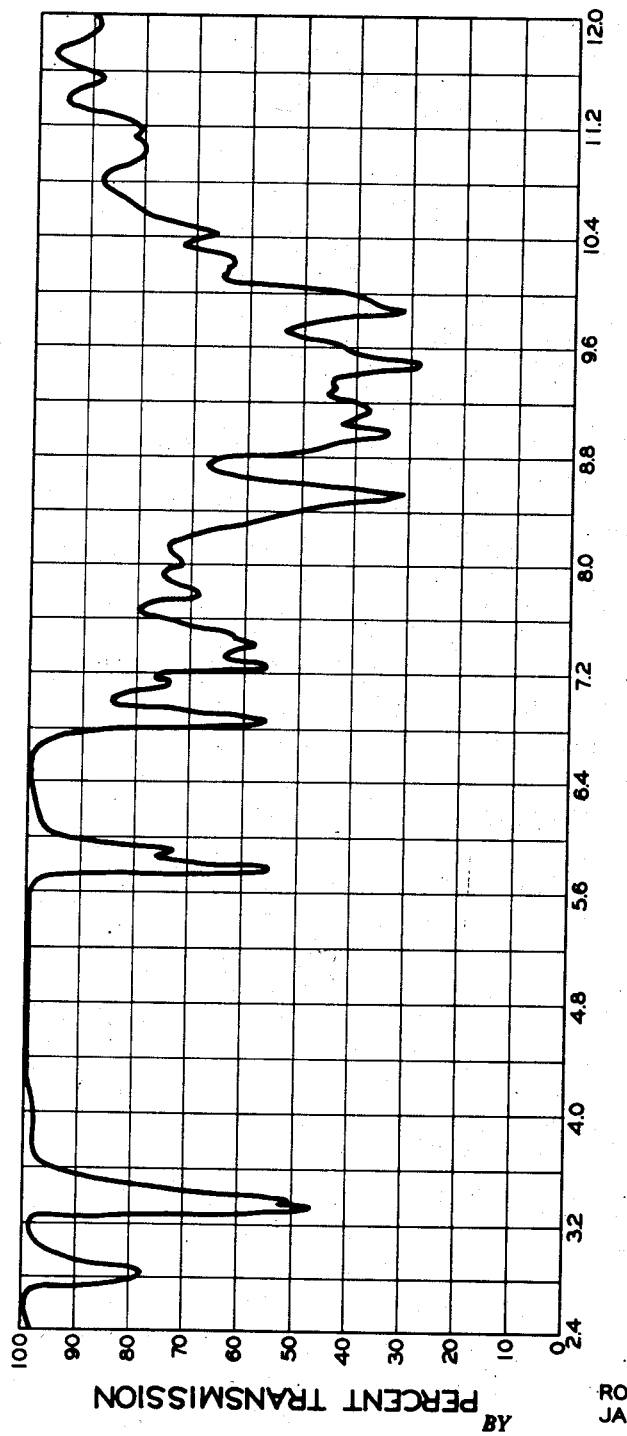

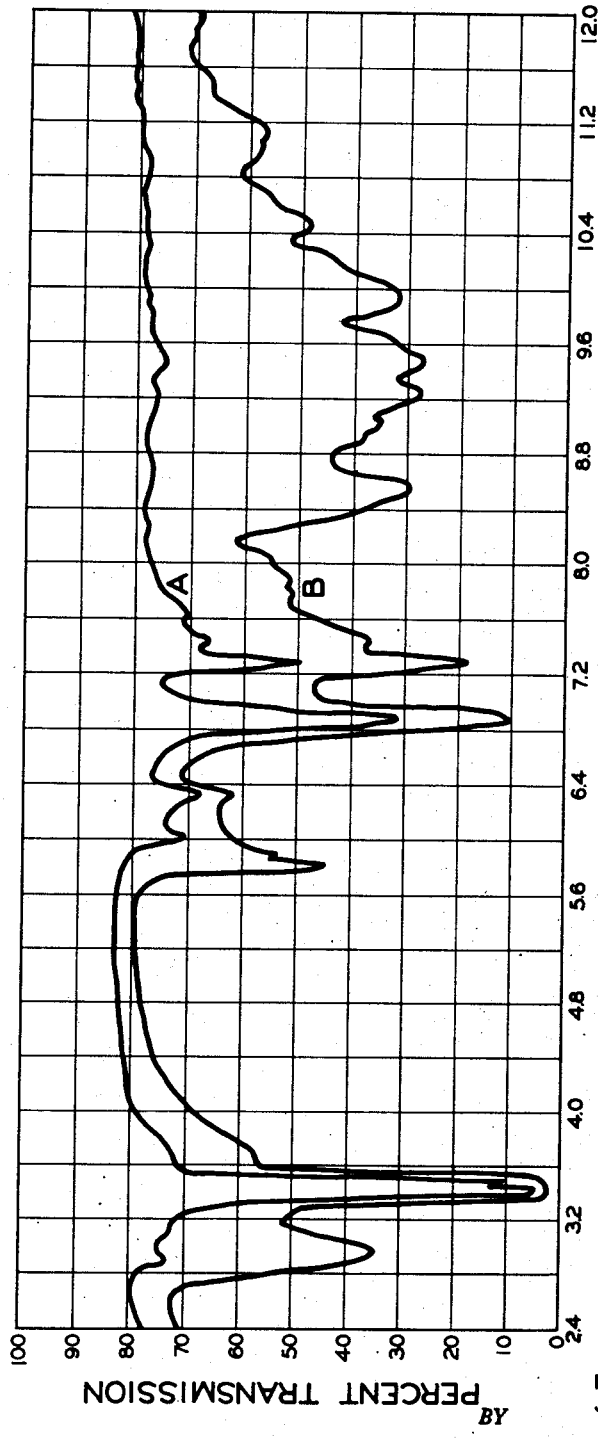

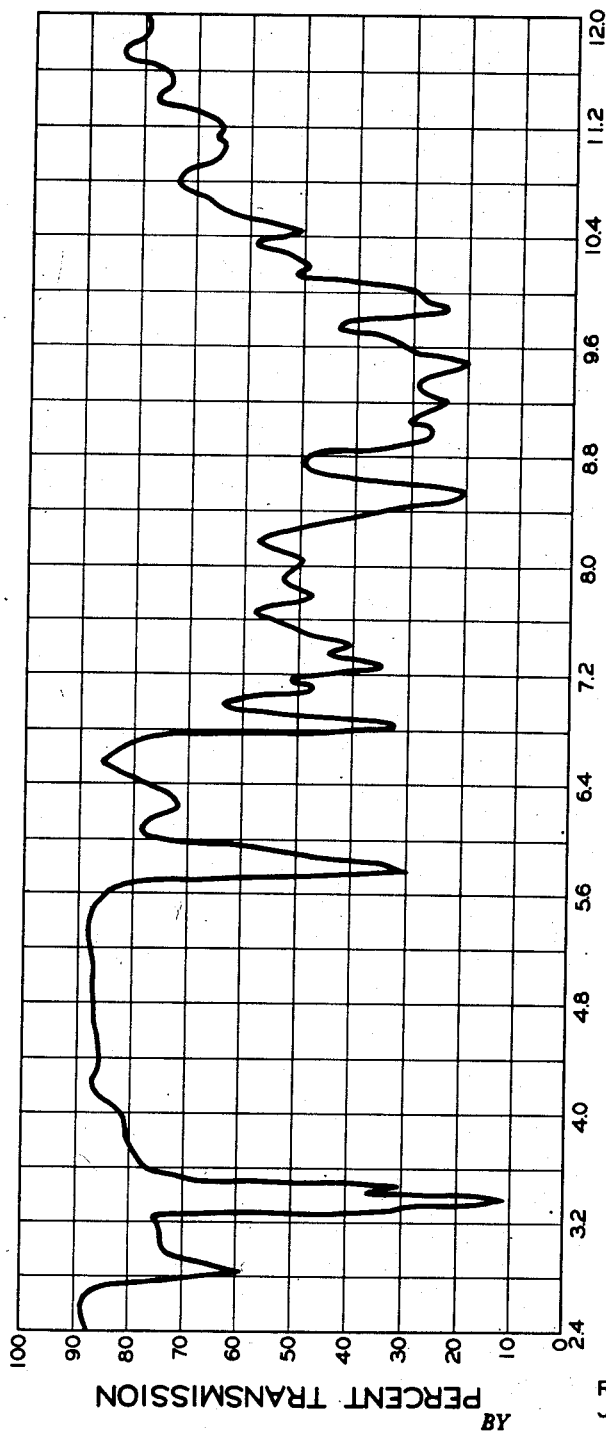

2,653,899

UNITED STATES PATENT OFFICE 2,653,899

ERYTHROMYCIN, ITS SALTS, AND METHOD OF PREPARATION

Robert L. Bunch and James M. McGuire, Indianapolis, Ind., assignors to Eli Lilly and Company, Indianapolis, Ind., a corporation of Indiana Application April 14, 1952, Serial No. 282,246

10 Claims. (Cl. 167—65)

This invention relates to novel compounds having antibiotic properties and to the processes of preparing them.

With respect to the novel compounds hereof, this invention embraces a nitrogenous base identified herein by the arbitrary name, erythromycin, and the acid addition salts of said base. The latter include a compound which for convenience is identified herein as erythromycin complex, an acid addition salt consisting of erythromycin and an unidentified organic acid.

Erythromycin and its acid addition salts are characterized by a broad antibacterial spectrum. They possess antibiotic activity against many microorganisms, both Gram-positive and Gram-negative. A further important antibiotic property of the compounds is their ability to inhibit the growth and development of certain of the Rickettsial bodies and large viruses, for example, epidemic typhus, and meningopneumonitis, and to inhibit effectively the growth and development of some of the spirochetes. The antibiotic properties of the compounds together with their low toxicities make them of great utility as therapeutic agents in the treatment of many diseases.

The antibiotic activity of erythromycin against illustrative organisms is shown in Table I. The antibiotic activities were determined either by streak-dilution or by broth-dilution tests. In the former test, the test organisms were streaked on a series of agar plates containing varied concentrations of the antibiotic to determine the minimum concentration of erythromycin in mcg. (micrograms) per ml. of substrate which inhibited growth over a period of 40 hours. In the latter test, the test organisms were grown in nutrient broth containing varied amounts of erythromycin. The presence of about 10 percent of horse serum in the medium had no noticeable effect on the antibacterial activity of the antibiotic.

In the table the letters (ag) and (bd) following the inhibitory concentration signify the test method (agar-dilution and broth-dilution test, respectively) which was used. Erythromycin salts possess antibiotic activities corresponding to the values given in the table, taking into consideration the increased molecular weights of the salts.

TABLE I

| Test organism | Inhibitory concentration (mcg./ml.) |
| --- | --- |
| Micrococcus pyogenes var. aureus | 0.8 (ag) |
| Micrococcus pyogenes var. aureus (Penicillin-resistant) | 0.4 (ag) |
| Micrococcus pyogenes var. aureus (streptomycin-resistant) | 0.8 (ag) |
| Listeria monocytogenes | 0.31 (bd) |
| Bacillus subtilis | 0.2 (ag) |
| Vibrio cholera | 0.63 (bd) |
| Mycobacterium sp. (607) | 6.2 (ag) |
| Mycobacterium phlei | 0.8 (ag) |
| Hemophilus pertussis | .31 (bd) |
| Mycobacterium avium | 1.6 (ag) |
| Mycobacterium smegmatis | 6.2 (ag) |
| Klebsiella pneumoniae | 6.2 (ag) |
| Brucella melitensis | 1.56 (bd) |
| Brucella suis | 1.56 (bd) |
| Neisseria intracellularis | 5.0 (bd) |
| Diplococcus pneumoniae (sulfa-fast strain) | 0.02 (bd) |
| Streptococcus pyogenes | 0.02 (bd) |
| Hemophilus influenzae | 1.25 (bd) |
| Streptococcus viridans | 0.16 (bd) |
| Corynebacterium diphtheriae | 0.02 (bd) |
| Vibrio comma | 6.25 (bd) |

With respect to the novel processes hereof, this invention embraces fermentative processes comprising the growing of an actinomycete in a culture medium containing assimilable sources of carbohydrate, nitrogen, and inorganic salts.

The actinomycete employed in the fermentative processes of this invention belongs to the genus, Streptomyces of the order Actinomycetales, according to the classification in Bergey's Manual of Determinative Bacteriology (6th edition), page 938. In its morphological characteristics the organism appears to be closely related to an actinomycete described by Waksman as Actinomyces 161 [Soil Science 8, 71–214 (1919)] and later identified by him as Streptomyces erythreus. As will be set forth hereinafter there are certain differences in the cultural properties of the organism described by Waksman and those of the novel isolate of this invention, so there is some doubt as to the proper identification of the isolate. However, we have provisionally classed the isolate of this invention as a strain of Streptomyces erythreus. The organism has been deposited in The Culture Collection of the Northern Regional Research Laboratories at Peoria, Illinois, where it has been assigned the Culture Number NRRL 2338, and has been added to the permanent collection of microorganisms.

The microorganism was isolated from a sample of soil obtained from Iloilo City, Iloilo, Philippine Islands, the method of isolation being as follows: A sample of the soil was suspended in sterile distilled water, the suspension greatly diluted and a small sample plated out on nutrient agar. The plate was incubated at about 30° C. for one week. The tiny, hard, scattered colonies of *Streptomyces erythreus* were removed with a platinum loop and were used to inoculate agar slants to provide larger quantities of the organism.

This invention will be described with particular reference to the above-mentioned strain of the organism, but it is to be understood that the fermentative processes of this invention not only embrace the use of *Streptomyces erythreus*, NRRL 2338, but also other erythromycin-producing strains of *Streptomyces erythreus*, such strains being readily produced and isolated by routinely applied isolation and strain-modification methods which include selection of cultured organisms, and exposure of organisms to modifying means such as X-ray, ultraviolet light, and chemical agents, for example, the nitrogen mustards. Illustrative examples of other erythromycin-producing strains, also deposited in the Culture Collection of Northern Regional Research Laboratories and assigned Culture Numbers, are NRRL 2359, NRRL 2360 and NRRL 2361.

*Streptomyces erythreus*, NRRL 2338 is characterized by the numerous physical, cultural, and physiological tests set forth in the following paragraphs. The system of Ridgway, Color Standards and Nomenclature (1912), is employed for the naming of most of the colors, and when that system is used, the initial letter of the color is capitalized.

When grown on nutrient agar media, *Streptomyces erythreus*, NRRL 2338, forms a branched mycelium with aerial spores in straight or irregularly coiled chains, but generally not in distinct spiral arrangement. Growth is typically slow, restricted, and scant to moderate in amount on most media, the relative abundance of vegetative and aerial growth varying with the nutrient medium used.

On simple synthetic agar media, the vegetative mycelium is scant and flat. The aerial mycelium is powdery white and is present in moderate amount. As the culture matures, the aerial growth becomes pale pink in color. A Russet-Vinaceous soluble pigment is formed and deepens as the culture ages.

When the organism is cultivated on agar media containing complex nitrogen sources, the vegetative mycelium is relatively more abundant than aerial growth. The vegetative growth is typically raised and has a tendency to burrow into the agar. The aerial mycelium in such cultures is generally sparse and white. In addition to the Russet-Vinaceous soluble pigment, some brown pigment is produced on many complex media.

The organism is very active physiologically. Starch and gelatin are readily hydrolyzed, although casein in litmus milk cultures is not attacked. Most of the common carbon sources are well utilized for growth. Temperatures of about 30° to 37° C. appear to be optimal for growth and sporulation.

Microscopic morphology

The morphology of *Streptomyces erythreus*, NRRL 2338, when grown on synthetic agar and calcium malate agar, is given below:

SYNTHETIC AGAR

There is a moderately branching aerial mycelium with spores borne on conidiophores in short, straight, or irregularly coiled and bent chains, but not in typical spirals. The spores are ovoid, and range in size from about 0.5 x 0.8$\mu$ to about 0.8 x 1.0$\mu$. The Gram-staining reaction is positive.

CALCIUM MALATE AGAR

The microscopic morphology observed is the same as that secured when the organism is cultured on synthetic agar, except that the spore chains are more extensively hooked or coiled, although not in regular spirals.

Cultural characteristics

The organism's cultural characteristics in a number of standard media are listed in the following paragraphs.

SYNTHETIC AGAR

Moderate vegetative growth, reverse cream color, becoming obscured by intense color of soluble pigment; restricted growth of white aerial mycelium which assumes a Pale Vinaceous-Fawn cast as the culture matures; moderate sporulation is observed microscopically; soluble pigment production is more pronounced than on other media, Russet-Vinaceous in young cultures becoming Dark Vinaceous-Brown or almost black after long incubation; colonies 4–6 mm. in diameter with raised centers, and flat, wavy margins; aerial mycelium thin, spreading, filamentous.

GLUCOSE-ASPARAGINE AGAR

Scant colorless vegetative growth with scant growth of white to Light Pinkish-Cinnamon aerial mycelium formed only after long incubation; sporulation sparse by microscopic observations; some soluble pigment Light Ochraceous-Salmon in color; colonies 2–3 mm. in diameter, irregularly convex with wavy or entire margin; surface smooth or wrinkled, powdery in texture.

EMERSON'S AGAR

Good vegetative growth, reverse cream color becoming Cameo Brown after 14 days' incubation and Hay's Russet after 28 days; thin growth of white aerial mycelium; intense Hazel soluble pigment; colonies 3–5 mm. in diameter with wrinkled and convoluted surface, raised or sunken centers and irregular wavy margins; colonial morphology variable, some lacking aerial mycelium, and others covered with a powdery spore crust.

CALCIUM MALATE AGAR

Scant, colorless vegetative growth with a moderate amount of Pale Pinkish-Cinnamon aerial mycelium; sporulation moderate by microscopic observation; soluble pigment Russet-Vinaceous, deepening to Army Brown after prolonged incubation; colonies 1–3 mm. in diameter with raised centers and filamentous margins; surface spore crust of fine, powdery texture; a microscopically granular halo of very scant aerial growth just outside the periphery of the colony.

GLUCOSE AGAR

Moderate vegetative growth, reverse Deep Olive Buff becoming Rood's Brown to Tawny;

aerial mycelium moderate in amount; white, soluble pigment of Rood's Brown, resembling that formed on Emerson's agar but less intense; colonies 2–4 mm. in diameter, raised, irregularly convoluted with wavy margin; surface powdery.

NUTRIENT AGAR

Scant vegetative mycelium, reverse Chamois color; moderate white aerial mycelium, no soluble pigment; colonies small, restricted, 2–3 mm. in diameter, irregularly convex with entire margin and powdery surface. Larger colonies often have stellate depression in center.

POTATO PLUG

Abundant vegetative mycelium with abundant Drab-Gray aerial mycelium with formation of a plug nearly black at top, shading to brown and reddish brown at base.

GELATIN

Moderate white colonial growth with hydrolysis nearly complete in 14 days, and complete in 20 days at 25° C.; light brown soluble pigment.

GLUCOSE BROTH

Heavy pellicle of growth with moderate white aerial mycelium formed late; soluble pigment near Ocher Red.

NUTRIENT BROTH

Growth poor, taking the form of a few floating colonies, some with white aerial mycelium; a small amount of beaded sediment, and no soluble pigment.

TYROSINE BROTH

Poor, flocculent submerged growth with trace of beaded surface growth, and no soluble pigment.

*Physiological characteristics*

LITMUS MILK

In litmus milk at 30° C. growth is poor, occurring in a ring on the wall of the tube. There is no hydrolysis or peptonization, but a slow development of an alkaline reaction (14 days).

At 37° C., growth is similar to that at 30° C., but growth and changes are less pronounced.

STARCH AGAR

Starch is strongly hydrolyzed.

CELLULOSE (FILTER PAPER STRIPS)

There is no growth with either ammonium or nitrate ions as nitrogen sources.

The following carbon and nitrogen utilization tests were carried out by the method described by Pridham and Gottlieb; J. Bacteriology 56, 107–114 (1948).

UTILIZATION OF CARBON SOURCES FOR GROWTH (a) Substrates well utilized include the following:

L(+)arabinose      D(+)raffinose     starch
L(+)rhamnose       inulin            sodium acetate
D(−)fructose       mannitol          sodium citrate
D(+)galactose      D(−)sorbitol      sodium malate
D(−)glucose        i(−)inositol      sodium succinate
D(+)maltose        dextrin           asparagine
sucrose (b) Substrates poorly utilized include D(+)-xylose and salicin.

There appears to be little if any utilization of D(+)lactose, dulcitol, sodium formate or sodium tartrate.

UTILIZATION OF INORGANIC NITROGEN SOURCES FOR GROWTH (a) Substrates well utilized include: ammonium sulfate and ammonium nitrate.

(b) Sodium nitrite is not utilized.

It should be understood that the above tests for utilization of energy sources are carried out under special growth conditions, and that the failure of the actinomycete to utilize certain energy sources under the test conditions does not preclude their utilization under different conditions.

Table II lists some of the differences between Actinomyces 161 described by Waksman, and *Streptomyces erythreus*, NRRL 2338.

TABLE II

| Medium | NRRL 2338 | Actinomyces 161 |
|---|---|---|
| | Microscopic Morphology | |
| | Moderate numbers of spores borne on conidiophores in short, straight or irregularly bent and coiled chains, not in typical spirals (14 days). | Numerous open spirals. |
| | Cultural Characteristics | |
| Synthetic agar | Moderate to good vegetative and aerial growth. Aerial mycelium white becoming partly pinkish upon maturation; color appearing ranges from Pale Vinaceous Fawn to Light Ochraceous Salmon. Soluble pigment Russet-Vinaceous becoming Dark Vinaceous-Brown or nearly black on long incubation. | Vegetative growth spreading, developing deep into medium. Aerial mycelium thick, solid, white. Soluble pigment Pomegranate Purple later turning Bordeaux color. On repeated transfers, pigment becomes vinaceous colored. |
| Gelatin | Scant brown soluble pigment. | No soluble pigment. |
| Calcium malate agar. | Soluble pigment Russet-Vinaceous deepening to Army Brown on long incubation. | No soluble pigment. |
| Litmus milk | Poor growth; no hydrolysis or peptonization. Slow development of alkaline reaction. | Growth in yellowish surface zone; very slow coagulation (not complete in 50 days). |

As noted above, *Streptomyces erythreus*, NRRL 2338 can be grown in a culture medium to produce an effective antibiotic agent. The culture medium can be any one of a number of media since, as is apparent from the above-described utilization tests, the organism is capable of utilizing many energy sources. However, for economy of production, maximum yield of antibiotic, and ease of isolation of erythromycin, certain culture media are preferable. Thus for example, the presently preferred sources of carbohydrate in the culture medium are starch and glucose. Other sources which may be included are sucrose, dextrins, molasses, and the like. The preferred nitrogen sources are corn steep, soybean meal or flour, and distillers' solubles, but other sources which are utilizable include casein, amino acid mixtures, peptones (both meat and soy), and the like. Inorganic nitrogen sources such as nitrate salts or ammonium salts can also be employed.

The nutrient inorganic salts to be incorporated in the medium include the customary salts capable of yielding ions or sodium, potassium, calcium, phosphate, chloride, sulfate and the like.

As is necessary for the growth and development of other microorganisms, essential trace elements should also be included in the culture medium for growing the actinomycete employed in this invention. Such trace elements are commonly supplied as impurities incidental to the addition of the other constituents of the medium.

For maximum growth and development of *Streptomyces erythreus*, NRRL 2338, the culture medium prior to inoculation with the organism should be adjusted to between pH 6.0 and pH 7.5, and preferably is adjusted to about pH 6.5. It has been observed that during the growth period of the organism and the production of the antibiotic, the medium gradually becomes alkaline and may attain an alkalinity from about 7.2 to about pH 8.5 or above, the final pH being dependent at least in part on the initial pH of the medium, the buffers present in the medium, and the period of time for which the organism is permitted to grow.

As is preferred for the production of other antibiotics in massive amounts, submerged, aerobic cultural conditions are the conditions of choice for the production of large amounts of erythromycin. For preparation of limited amounts, shake flask and surface culture in bottles can be employed. Furthermore, as is well known, when growth is carried out in large tanks it is preferable to use the vegetative form of the organism for inoculation of the production tanks to avoid a pronounced lag in the production of the antibiotic and the attendant inefficient utilization of the equipment. Accordingly it is desirable first to produce a vegetative inoculum of the organism by inoculating a relatively small quantity of culture medium with the spore form of the organism, and when a young, active vegetative inoculum has been secured, to transfer the vegetative inoculum aseptically to the large tanks. The medium in which the vegetative inoculum is produced can be the same or different medium as that utilized for the production of the antibiotic.

*Streptomyces erythreus*, NRRL 2338, can be grown well at temperatures between about 25° C. and about 37° C. Optimal antibiotic production appears to occur with the culture medium maintained at about 26–30° C.

As is customary in producing antibiotics by submerged culture processes, sterile air is blown through the culture medium. For efficient growth of the organism and antibiotic production the volume of air employed in the tank production of erythromycin preferably is upwards of 0.1 volume of air per minute per volume of culture medium. More efficient growth and antibiotic production are secured when the volume of air used is at least .4 volume of air per minute per volume of culture broth.

The rate of production of the antibiotic and the concentration of the antibiotic activity in the culture medium can readily be followed during the growth period of the microorganism by testing samples of the culture medium for their antibiotic activity against organisms known to be susceptible to the antibiotic, for example, *Staphylococcus aureus* and *Mycobacterium tuberculosis*. For such determinations, it is convenient to employ a test which comprises making serial dilutions of the culture samples, adding portions of the diluted samples to melted nutrient agar, solidifying the agar in a petri dish, inoculating the plate with a young culture of *S. aureus* or *M. tuberculosis*, and determining the greatest dilution of the culture medium which causes complete inhibition of the growth of organism on the nutrient agar.

The production of the antibiotic can also be followed by turbidimetric test procedures such as are commonly employed in connection with the production of other antibiotics.

In general, maximum production of the antibiotic after inoculation of the culture medium occurs within about 2 to 5 days when submerged aerobic culture is employed, and within about 5 to 10 days when surface or shake flask culture is used.

The antibiotic compounds of this invention can be recovered from the culture medium by extractive or adsorptive techniques. The former are preferred for commercial production inasmuch as they are less time-consuming and expensive. For the extraction of the antibiotic compound from the culture medium, water-immiscible, polar organic solvents are preferred, such including alkyl esters of fatty acids, for example, ethyl acetate and amyl acetate; chlorinated hydrocarbons, for example, chloroform and ethylene dichloride; alcohols having slight water-solubility, for example, butanol and amyl alcohol; ketones of slight water-solubility, for example, methyl amyl ketone; and ethers, for example, ethyl ether, and dibutyl ether. Other solvents of similar character can also be employed.

The antibiotic material in the organic solvent extract of the culture broth can be evaporated to dryness, preferably in vacuo, to yield the antibiotic in crude form. Alternatively, the antibiotic material can be separated from the culture broth by contacting the filtered broth with an adsorbing agent. Adsorbing agents can also be used effectively for purification by adsorption chromatography, using adsorbents such as activated alumina, silica gel, magnesium aluminum silicate, and the like. Elution of the antibiotic from the adsorbent is readily effected by employing a polar organic solvent in which the antibiotic compound is soluble. Activated carbon is not particularly well suited for employment in a chromatographic column inasmuch as carbon strongly adsorbs the antibiotic so that the adsorbed material is eluted only with difficulty. However, activated carbon can successfully be employed for adsorbing the antibiotic directly from the culture broth if the carbon is pre-coated with an agent, e. g. acetic acid, in order to decrease the bonding affinity of the carbon for the antiobiotic.

When an extractive process alone is employed for recovering the antiobiotic, a suitable method of recovering the antibiotic from the extraction solvent comprises the evaporation of the solvent to a relatively small volume, and the precipitation of the antibiotic from the solvent by the addition of a miscible solvent in which the antibiotic has slight solubility. The antibiotic material which precipitates in crude, but solid, and at times even crystalline form, is then further purified by recrystallization from one or more solvents or mixtures thereof. Suitable solvents for recrystallization include aqueous acetone, aqueous methanol, aqueous ethanol, and the like.

A presently preferred manner of isolating erythromycin in the form of its base is to make the filtered culture broth alkaline to about pH 9 to pH 10, preferably about pH 9.5, and to extract the adjusted broth with an alkyl acetate, e. g. amyl acetate. The erythromycin base which dissolves in the amyl acetate is then extracted into water adjusted to below pH 6.5, preferably to about pH 5. The aqueous extract is reduced in volume as by evaporation in vacuo to incipient precipitation, and is then made alkaline to about pH 9.5, whereupon erythromycin base separates in solid, usually crystalline, form. The base is isolated by filtration or centrifugation and is purified by recrystallization.

The acid addition salts of erythromycin can be obtained by treating an aqueous solution of erythromycin base with an equivalent of acid, and evaporating the solution to dryness in vacuo. Alternatively, an organic solvent solution of the erythromycin base can be treated with the acid or a solution thereof, and the erythromycin salt precipitated directly from the solution. When acid addition salts of strong acids are being prepared, care should be taken during the addition of the acid to the antibiotic to avoid local high concentrations of the acid, inasmuch as erythromycin is relatively unstable in solutions of low pH. Illustrative examples of salts which have been prepared are the hydrochloride, sulfate, citrate, mandelate, oleate, palmitate, myristate, stearate, and oxalate salts. Other similar salts can readily be prepared by the above mentioned procedures. For therapeutic purposes the salts chosen should obviously be the relatively nontoxic salts.

When the culture broth is extracted or treated with an adsorbing agent at an alkalinity less than about pH 9, the antibiotic compound generally isolated is erythromycin complex. The complex exhibits the antibiotic properties characteristic of erythromycin base, but possesses a greatly reduced water solubility and in general a lesser solubility in organic solvents. From the complex, erythromycin base can be obtained by dissolving or suspending the complex in water, adjusting the pH of the aqueous mixture to about pH 9.8 to liberate erythromycin base from the complex, and extracting the alkaline mixture with an organic solvent. The erythromycin base which transfers from the water into the organic solvent is isolated, and is purified by recrystallization.

The base, erythromycin, possesses the following physical and chemical properties.

Erythromycin crystallizes in white needles which melt with prior softening at about 136–40° C. on a Köfler micromelting point block. It is soluble to the extent of about 2 mg. per ml. in water, and is very soluble in alcohol, acetone, chloroform, acetonitrile, and ethyl acetate. It is moderately soluble in ether, ethylene dichloride and amyl acetate.

An electrometric titration in dimethylformamide-water solution (2:1, parts by volume) reveals the presence of one titratable group of $pK'_a = 8.7$.

The molecular weight as determined by the titration data appears to be about $754 \pm 7$.

Erythromycin crystallizes from aqueous acetone in the form of needles and short rods having positive elongation and parallel extinction. Crystal samples dried at room temperature in vacuo over phosphorous pentoxide showed the following refractive indices in sodium light at 27° C.:

$$n_1 = 1.452$$
$$n_2 = 1.473$$

The specific rotation of a sample dried at room temperature in vacuo over phosphorus pentoxide for four hours is as follows:

$[\alpha]_D^{25} = -78°$
$c = 1.99$ percent (weight-volume) in ethanol.

An average of several elemental analyses of samples which prior to analysis were dried at 60° C. in vacuo for 3 hours over phosphorus pentoxide gave the following values:

| | Per cent |
|---|---|
| Carbon | 61.05 |
| Hydrogen | 9.43 |
| Nitrogen | 1.91 |
| Oxygen (by difference) | 27.61 |

The foregoing values when employed in calculating the empirical formula of erythromycin give the formula $C_{38-9}H_{69-71}NO_{13}$. A sample of the material dissolved in a concentration of about 3.14 percent in chloroform (weight-volume) gave the following distinguishable bands in an infra-red spectrum over the range of $2.4\mu$ to $12.0\mu$: 2.82, 3.32, 5.77, 5.91, 6.86, 7.13, 7.25, 7.42, 7.78, 8.02, 8.54, 8.98, 9.16, 9.32, 9.49, 9.86, 10.23, 10.42, 10.9, 11.17, 11.55 and 11.9.

The infra-red absorption curve of the above solution is shown in Fig. 1 of the accompanying drawings.

A powder X-ray diffraction pattern using unfiltered chromium radiation and a wave-length value of 2.2896 A. in calculating the interplanar spacings, gives the following values:

| "d" (Interplanar Spacing) | $I/I_1$ (Relative Intensity) |
|---|---|
| 14.5 | 0.63 |
| 13.3 | 1.00 |
| 10.9 | 0.06 |
| 9.9 | 0.38 |
| 8.65 | 0.25 |
| 7.70 | 0.38 |
| 7.10 | 0.13 |
| 6.65 | 0.13 |
| 5.80 | 0.25 |
| 4.95 | 0.13 |
| 4.65 | 0.06 |

The ultra-violet absorption spectrum is characterized by a single broad peak of weak intensity having a maximum at 289 m$\mu$ at pH 6.3 with $\epsilon$, the molar extinction, about 25.7.

Erythromycin when recrystallized from petroleum ether, or a mixture of water and acetone yields fine needles of hexagonal crystal system.

Erythromycin hydrochloride possesses the following physical and chemical properties.

It crystallizes from aqueous solvents in white needles which melt at about 170–173° C. on a Köfler micromelting point block. It is very soluble in water and the lower alcohols and is slightly soluble in ethyl acetate. It is only very slightly soluble in solvents such as ether, amyl acetate, chloroform, and the like.

An average of several elemental analyses of samples of erythromycin hydrochloride which prior to analysis were dried in vacuo at 78° C. for 3 hours over phosphorus pentoxide gave the following values:

|  | Per cent |
|---|---|
| Carbon | 58.74 |
| Hydrogen | 8.89 |
| Nitrogen | 1.89 |
| Chlorine | 4.58 |
| Oxygen (by difference) | 25.90 |

A sample of erythromycin hydrochloride mulled in petroleum ether gives the following distinguishable bands in an infra-red spectrum over a range of $2.4\mu$ to $12.0\mu$: 2.94, 3.38, 5.79, 5.88, 6.85 7.26, 7.43, 7.78, 7.88, 8.01, 8.55, 9.03, 9.24, 9.46, 9.92, 10.47, 11.15, 11.5 and 12.0.

The infra-red absorption spectrum of erythromycin hydrochloride dried in vacuo at room temperature is shown in Fig. 2 of the drawings. The upper line is the absorption curve of the mineral oil alone, and the lower line is the curve of the mineral oil mull of erythromycin hydrochloride.

Erythromycin complex is identified by means of the following physical and chemical properties.

The complex crystallizes in white needles which melt at about 82–83.5° C. (uncorr.) on a Fisher-Johns melting point apparatus. It is quite soluble in acetone, the lower alcohols, chloroform and ethylene dichloride but is only slightly soluble in the higher ketones, and ethers.

An electometric titration of the base in a dimethylformamide-water solution (2:1, parts by volume) reveals the presence of two ionizable groups of $pK'_a$ 7.6 and $pK'_a$ 8.4.

The molecular weight as determined by X-ray crystallographic data using a sample air dried at room temperature in vacuo over phosphorus pentoxide is calculated to be about 1130.

The specific rotation of a sample dried in vacuo at room temperature over phosphorus pentoxide is as follows:

$[\alpha]_D^{25°} = -47°$ c=2 percent (weight-volume) in ethanol.

An average of several elemental analyses of samples of erythromycin complex which prior to analysis, were dried for twelve hours at room temperature in vacuo over phosphorus pentoxide gave the following values:

|  | Per cent |
|---|---|
| Carbon | 64.71 |
| Hydrogen | 10.23 |
| Nitrogen | 1.35 |
| Oxygen (by difference) | 23.71 |

A sample of the complex dried in vacuo at room temperature, and dissolved in a concentration of about 5.53 percent in chloroform (weight-volume) gives the following distinguishable bands in an infra-red spectrum over the range of $2.8\mu$ to $12.0\mu$: 2.85, 3.40, 3.49, 5.79, 6.25, 6.86, 7.14, 7.26, 7.44, 7.80, 8.05, 8.54, 8.98, 9.21, 9.49, 9.88, 10.18, 10.43, 11.04, 11.16, 11.52, and 11.9

The infra-red absorption curve of the above solution is shown in Fig. 3 of the accompanying drawings.

A powder X-ray diffraction pattern using unfiltered chromium radiation and a wave-length value of 2.2896 A. in calculating the interplanar spacings, gives the following values:

| "d" (Interplanar Spacing) | $I/I_1$ (Relative Intensity) |
|---|---|
| 21.2 | .13 |
| 19.0 | 1.00 |
| 16.7 | .03 |
| 15.3 | .13 |
| 11.0 | .05 |
| 10.4 | .13 |
| 10.1 | .13 |
| 9.53 | .11 |
| 8.25 | .08 |
| 7.86 | .08 |
| 7.57 | .13 |
| 7.18 | .13 |
| 6.92 | .13 |
| 6.56 | .03 |
| 6.30 | .03 |
| 6.20 | .21 |
| 5.89 | .08 |
| 5.65 | .05 |
| 5.36 | .06 |
| 5.17 | .11 |
| 5.00 | vw |
| 4.86 | .21 |
| 4.74 | .05 |
| 4.69 | .05 |
| 4.52 | .05 |
| 4.42 | .21 |
| 4.28 | vw |
| 4.11 | .08 |
| 4.01 | vw |
| 3.87 | vw |
| 3.77 | vw |
| 3.71 | vw |
| 3.58 | .03 |
| 3.45 | .03 |
| 3.28 | vw |
| 3.19 | vw |
| 3.10 | vw |
| 2.73 | vw |
| 2.63 | vw |
| 2.59 | vw |
| 2.52 | vw |
| 2.49 | vw |
| 2.34 | vw |

(vw means very weak.)

The ultra-violet absorption spectrum of an ethanol solution of the complex shows one maximum at 274 m$\mu$.

$E_{1\,cm}^{1\%} = 1.07$

The complex when recrystallized from petroleum ether, or a mixture of water and acetone yields fine needles of hexagonal crystal system, which show a parallel extinction and positive elongation, the elongation being parallel to the c axis. At 25° C. in sodium light, the refractive indices of the crystals are as follows:

$\epsilon = 1.509$
$\omega = 1.499$

The sign of double refraction is positive.

Aqueous solutions or suspensions of the antibiotic compounds of this invention are moderately stable at room temperature within the pH range of about pH 5.0 to about pH 8.5. At a pH outside the above specified range, the antibiotic potency soon disappears. More strongly acid solutions cause a rapid loss in antibiotic potency, and more basic solutions cause an equally certain although less rapid loss. Maximum stability of solutions of the antibiotic compounds is attained when the pH of solutions is kept within pH 6 to pH 8.

Erythromycin and its salts generally contain amounts of water when crystallized from solvents containing water, and may contain amounts of alcohols or other similar solvents when crystallized from solutions containing such solvents.

The amount of water or other solvent present appears to be dependent at least in part upon the conditions under which crystallization occurs and the degree of drying to which the material is subjected, and may vary from a small amount to a quantity which is upwards of several percent.

This invention is further illustrated by the following examples:

EXAMPLE 1

*Preparation of erythromycin*

An inoculum broth is prepared having the following composition:

| | | |
|---|---|---|
| Starch | lbs | 32 |
| Soybean meal | lbs | 32 |
| Corn steep solids | lbs | 10 |
| Sodium chloride | lbs | 10 |
| Calcium carbonate | lbs | 6 |
| Water | gals | 250 |

The broth is placed in an iron tank of 350 gallon capacity and is sterilized by heating it under pressure at a temperature of about 120° C. for 30 minutes. The sterilized broth is cooled and inoculated aseptically with spores of *Streptomyces erythreus*, NRRL 2338. The organism is grown in the broth at about 26° C. for a period of 45 hours. During the growth period the broth is stirred and aerated with sterile air in the amount of about 0.5 volume of air per volume of culture broth per minute.

In a 1600-gallon iron tank is placed a fermentation broth having the following composition:

| | | |
|---|---|---|
| Starch | lbs | 153 |
| Soybean meal | lbs | 153 |
| Corn steep solids | lbs | 51 |
| Calcium carbonate | lbs | 33 |
| Sodium chloride | lbs | 51 |
| Water | gals | 1,200 |

The culture broth is sterilized by heating it under pressure at about 120° C. for about 30 minutes. The broth is cooled and the above inoculant culture is added aseptically. The organism is grown in the broth for 4 days at a temperature of 26° C. During the growth period the broth is stirred and sterile air is blown through the broth at a rate of about 0.5 volume of air per volume of broth per minute. At the end of the growth period the broth shows an antibiotic activity equivalent to about 150 mcg. of erythromycin per ml. of broth. The culture broth (about 1100 gallons in volume) is adjusted to pH 9.5 with 40 percent sodium hydroxide solution and is filtered to remove the mycelium, the filtration being assisted by use of 3 percent of "Hyflo Super-Cel" (a filter aid sold by Johns Manville Company). The clear filtrate is extracted with amyl acetate in a Podbielniak extractor using a ratio of 1 volume of amyl acetate to 6 volumes of clarified broth. The amyl acetate extract is in turn extracted batch-wise with water brought to about pH 5 by the addition of sulfuric acid. Two extractions are carried out, the first with ½ volume and the second with ¼ volume of water adjusted to pH 5 with sulfuric acid. The aqueous extracts are combined and adjusted to pH 8.0 with sodium hydroxide solution. The alkaline solution is concentrated in vacuo to a volume of about 30 gallons, and the solution is then adjusted to pH 9.5 by the addition of aqueous sodium hydroxide, and is allowed to stand. Erythromycin separates as a crystalline material. The crystals are filtered off, the mother liquor is adjusted to about pH 8 by the addition of dilute sulfuric acid, and is concentrated in vacuo to a volume of about 20 gallons. The solution is adjusted to about pH 9.5 and allowed to stand, whereupon an additional amount of erythromycin separates in crystalline form. The total amount of erythromycin obtained is about 256 g.

The erythromycin is purified by several recrystallizations from aqueous acetone (2:1 mixture).

EXAMPLE 2

*Preparation of erythromycin hydrochloride*

1 g. of erythromycin is suspended in 10 ml. of water and dilute hydrochloric acid is added to bring the pH of the mixture to pH 6.5. The aqueous solution is concentrated in vacuo to about 1/10 of its original volume, and is cooled in a refrigerator whereupon crystalline erythromycin hydrochloride precipitates in crystalline form. The hydrochloride salt is purified by recrystallization from a mixture of ethanol and ether.

EXAMPLE 3

*Preparation of erythromycin complex*

An inoculum broth is prepared having the following composition:

| | | |
|---|---|---|
| Starch | lbs | 30 |
| Soybean meal | lbs | 30 |
| Corn steep solids | lbs | 10 |
| Sodium chloride | lbs | 10 |
| Calcium carbonate | lbs | 6 |
| Water | gals | 250 |

The broth contained in an iron tank of 350 gallon capacity is sterilized by heating it under pressure at a temperature of about 120° C. for 30 minutes. The sterilized broth is cooled and is inoculated under aseptic conditions with the spore form of *Streptomyces erythreus*, NRRL 2338. The organism is grown in the broth at about 26° C. for a period of 35 hours. During the growth period the broth is stirred, and is aerated with sterile air in the amount of about one-half volume of air per volume of culture broth per minute. By the end of the growth period a good growth of the vegetative form of the organism is obtained.

In a 1600-gallon iron tank is placed a fermentation medium having the following composition:

| | | |
|---|---|---|
| Glucose | lbs | 250 |
| Starch | lbs | 250 |
| Soybean meal | lbs | 470 |
| Corn steep solids | lbs | 92 |
| Brewers yeast | lbs | 50 |
| Calcium carbonate | lbs | 20 |
| Sodium chloride | lbs | 50 |
| Cobalt chloride | oz | 4 |
| Water | gals | 1,200 |

The culture broth is sterilized by heating it under pressure in the manner used for the inoculum broth. The cooled fermentation broth is then inoculated under aseptic conditions with 125 gallons of the above-described vegetative inoculum culture broth, and the organism is grown in the broth for 4 days at a temperature of 26° C. During the growth period the growth mixture is stirred, and sterile air is passed into the broth at the rate of about 0.5 volume of air per volume of broth per minute. At intervals during the growth period the amount of antibiotic contained in the culture broth is determined by the agar dilution method, until at the end of the 4-day growth period the amount of antibiotic contained in the broth attains an activity equivalent to about 250 mcg. of erythromycin per ml. of broth. During the growth period the pH of the broth changes from its original value of pH 6.2 to a pH value of about 8.0. From the culture broth the antibiotic is isolated in the form of erythromycin complex in the following manner:

The culture broth is filtered on a 36" Sperry press with the aid of 3 percent of "Hyflo Super-Cel." The filtrate is defatted by extracting it with about 400 l. of petroleum ether. The extracted filtrate is adjusted to about pH 8.5 by the addition of sodium hydroxide solution, and is extracted with two 1000 l. portions of ethyl acetate. The ethyl acetate extracts are combined and evaporated in vacuo yielding about 661 g. of a dark brown solid. The solid material is triturated with petroleum ether whereby erythromycin complex is obtained in the form of a light tan solid. The solid is dissolved in a minimum amount of ethanol, and water is added until the solution becomes turbid. The turbid solution is cooled in a refrigerator for about 48 hours whereby the complex is obtained in the form of crystals. The crude crystals are recrystallized from a mixture of alcohol and water as above described, and are then recrystallized twice from aqueous acetone. The material thus obtained is substantially pure erythromycin complex which melts at about 82–83° C.

EXAMPLE 4

*Preparation of erythromycin complex in shake flask*

A sporulated culture of Streptomyces erythreus, NRRL 2338, is produced by growing the organism on a nutrient agar slant. The spores are recovered as a water suspension by layering the slant with a small amount of water and gently scraping the spores from the slant surface.

About 1 ml. of the spore-suspension thus obtained is used for inoculating under sterile conditions the following sterilized culture medium:

| | |
|---|---|
| Glucose | g-- 1.5 |
| Soybean meal | g-- 1.5 |
| Corn steep solids | g-- .5 |
| Sodium chloride | g-- .5 |
| Calcium carbonate | g-- .2 |
| Water | ml-- 100 |

The inoculated culture medium is incubated at about 27° C. for about 48 hours until good vegetative development is observed. The culture medium containing the vegetative growth is divided equally into ten portions, and the portions are used to inoculate ten 1-liter Erlenmeyer flasks, each flask containing about 200 ml. of a sterilized fermentation culture medium having the following composition:

| | |
|---|---|
| Starch | g-- 30 |
| Soybean meal | g-- 30 |
| Corn steep solids | g-- 10 |
| Sodium chloride | g-- 5 |
| Calcium carbonate | g-- 2 |
| Water | l-- 2 |

The flasks containing the inoculated culture media are placed in an incubator room maintained at a temperature of about 28° C. and shaken for about 80–90 hours on a reciprocal shaker having a 2" stroke, and run at a rate of 114 complete excursions per minute. From time to time samples of the culture medium are tested for the amount of the antibiotic activity contained therein. When the amount of antibiotic activity attains a value of about 200 mcg./ml. of broth, the broths in the shake flasks are pooled, and are filtered to remove the mycelium.

The antibiotic activity is recovered from the broth in the form of erythromycin complex by extracting the broth twice with equal volumes of butanol, and evaporating the butanol to dryness in vacuo. The solid erythromycin complex which is left as a residue is purified by recrystallizing it several times from aqueous acetone.

EXAMPLE 5

*Purification of erythromycin complex by carbon adsorption*

One liter of filtered cultured broth obtained by the shake flask procedure described in Example 4 is treated with 2 g. of acid treated "Norit SG" (an activated carbon) prepared by stirring the carbon in five times its weight of 5 percent acetic acid for fifteen minutes, filtering off the carbon, and washing it with 25 times its weight (dry) of water. The carbon-broth mixture is stirred for about one-half hour, the carbon is filtered off, and is washed with 500 ml. of water. The activated carbon is stirred with 500 ml. butanol to elute the erythromycin complex. The mixture is filtered to remove the carbon, and the butanol filtrate which contains the complex is evaporated azeotropically to dryness. The residue of erythromycin complex is purified by recrystallizing it from aqueous ethanol.

EXAMPLE 6

*Purification of erythromycin complex by chromatography*

Crude erythromycin such as that obtained by ethyl acetate extraction of the culture broth as described in Example 3 is dissolved in benzene in the amount of about 200 mg. of crude complex per 5 ml. of benzene.

The benzene solution is passed over a silica gel column, ¾ x 11" in size. The column is washed with a mixture of 15 percent methanol in benzene to remove an inactive brown colored material. The complex is eluted from the column by a methanol wash. The methanol eluate is evaporated to dryness in vacuo and the residue of erythromycin complex, which is upwards of 90 percent pure, is purified by recrystallization from aqueous acetone.

EXAMPLE 7

*Preparation of erythromycin in shake flasks*

A culture broth containing antibiotic activity is produced in accordance with the procedure described in Example 4. The antibiotic activity in the culture broth is recovered from the broth in the form of erythromycin in the following manner:

The broth is made alkaline to about pH 9.8 by the addition of sodium hydroxide, and is extracted with 2 one-fourth volume portions of ethyl acetate. The combined ethyl acetate extracts which contain the erythromycin are extracted with 2 equal-volume portions of water acidified to about pH 5.0 with sulfuric acid. The aqueous extracts are combined and are adjusted to about pH 7.0 with aqueous sodium hydroxide. The neutralized solution is reduced to about $\frac{1}{10}$ its original volume to the point of incipient precipitation. The aqueous mixture is brought to about pH 9.5 with sodium hydroxide solution and is allowed to stand in the cold for several hours.

The erythromycin which separates is filtered off and recrystallized from aqueous ethanol.

EXAMPLE 8

*Purification of erythromycin by chromatography*

An aqueous solution containing erythromycin such as that obtained in accordance with the procedure of Example 1, by extracting filtered culture broth with amyl acetate, and the amyl acetate extract with water, is adjusted to pH 9.5 with aqueous alkali, and is extracted with benzene.

A 100 ml. aliquot of the benzene extract containing antibiotic activity equivalent to 10 mg. of erythromycin per ml. of benzene, is passed over a magnesium aluminum silicate ("Florisil") column 1" in diameter and 12" long. The column is washed with 5 percent methanol in benzene to remove a brown band appearing in the column, and until the eluate comes through substantially colorless. The antibiotic adsorbed on the column is removed by elution with 50 percent methanol in benzene. The eluate is evaporated to dryness in vacuo and the residue of erythromycin is recrystallized from aqueous acetone.

EXAMPLE 9

*Preperation of erythromycin from erythromycin complex*

1 g. of erythromycin complex is suspended in 100 ml. of water and the suspension is adjusted to about pH 6.3 by the addition of dilute hydrochloric acid. The aqueous mixture is extracted with chloroform and the extracted aqueous solution is adjusted to about pH 9.8 with aqueous sodium hydroxide. The alkaline solution is extracted twice with equal-volume portions of amyl acetate, the amyl acetate extracts are combined, and are evaporated to dryness in vacuo. The residue of erythromycin base is recrystallized from aqueous ethanol.

EXAMPLE 10

*Preparation of erythromycin hydrochloride*

600 ml. of an aqueous solution of antibiotic such as that described in Example 8 and having an antibiotic activity equivalent to about 525 mcg. of erythromycin per ml. of solution is adjusted to pH 9.5 with aqueous sodium hydroxide solution and is extracted with 15 ml. of amyl acetate, thereby securing a solution having an antibiotic activity equivalent to 14.8 mg. of erythromycin per ml. of solution. To the amyl acetate extract is added 0.1 ml. of ethanol containing 0.0087 ml. of concentrated aqueous hydrochloric acid. The mixture is cooled in the refrigerator for several hours whereupon erythromycin hydrochloride separates in substantially pure, crystalline form.

We claim:

1. A method of producing an antibiotic agent which comprises cultivating under aerobic conditions an erythromycin-producing strain of *Streptomyces erythreus* in a culture medium containing assimilable sources of carbohydrate, nitrogen and inorganic salts until substantial antibiotic activity is produced by said organism in said culture medium.

2. A method of producing erythromycin which comprises cultivating an erythromycin-producing strain of *Streptomyces erythreus* in a culture medium containing assimilable carbohydrate, nitrogen and inorganic salts, under submerged aerobic conditions until substantial antibiotic activity is produced by said organism in said culture medium, and recovering the erythromycin from said culture medium.

3. A method according to claim 2 in which the organism is *Streptomyces erythreus*, NRRL 2338.

4. A method according to claim 2 which includes the step of extracting the culture broth at a pH of about pH 9 to pH 10 with a water-immiscible, polar organic solvent.

5. An antibiotic substance of the group consisting of nitrogenous base and the acid addition salts thereof, said base having the following properties: a molecular weight of about 754±7, obtained from titration data; a pK′$_a$ of 8.7 when titrated in dimethylformamide-water solution (2:1, parts by volume); and, in a chloroform solution of about 3.14 percent concentration (weight-volume) the following distinguishable bands in an infra-red absorption spectrum over the range of 2.4$\mu$ to 12.0$\mu$: 2.82, 3.32, 5.77, 5.91, 6.86, 7.13, 7.25, 7.42, 7.78, 8.02, 8.54, 8.98, 9.16, 9.32, 9.49, 9.86, 10.23, 10.42, 10.9, 11.17, 11.55 and 11.9.

6. The nitrogenous base as described in claim 5.

7. The hydrochloride salt of the nitrogenous base as described in claim 5, said salt in a mineral oil mull having the following distinguishable bands in an infra-red absorption spectrum over the range of 2.4$\mu$ to 12.0$\mu$: 2.94, 3.38, 5.79, 5.88, 6.85, 7.26, 7.43, 7.78, 7.88, 8.01, 8.55, 9.03, 9.24, 9.46, 9.92, 10.47, 11.15, 11.5 and 12.0.

8. A complex organic acid addition salt of a base as described in claim 5, said salt in a chloroform solution of about 5.53 percent concentration (weight-volume) having the following distinguishable bands in an infra-red absorption spectrum over the range of 2.4$\mu$ to 12.0$\mu$: 2.85, 3.40, 3.49, 5.79, 6.25, 6.86, 7.14, 7.26, 7.44, 7.80, 8.05, 8.54, 8.98, 9.21, 9.49, 9.88, 10.18, 10.43, 11.04, 11.16, 11.52 and 11.9 a melting point of about 82–83.5° C. (uncorr.) on a Fisher–Johns melting point apparatus, and appreciable solubility in acetone, the lower alcohols, chloroform, and ethylene dichloride, a slight solubility in the higher ketones and ethers, and an ultraviolet absorption spectrum maximum at 275 m$\mu$.

$$E^{1\%}_{1\,cm.} = 1.07$$

9. A method according to claim 2 in which the culture medium is maintained at a temperature of about 25–37° C., and the growth of the organism is carried out for a period of from 2 to 5 days.

10. A compound according to claim 5 in substantially pure, crystalline form.

ROBERT L. BUNCH.
JAMES M. McGUIRE.

References Cited in the file of this patent

UNITED STATES PATENTS

| Number | Name | Date |
| --- | --- | --- |
| 2,378,449 | Tishler | June 19, 1945 |
| 2,474,758 | Peck | June 28, 1949 |

OTHER REFERENCES

Clark: Article in Antibiotics and Chemotherapy, volume 3, Number 7, July 1953, pages 663 to 671.

Tanner et al.: Article in Antibiotics and Chemotherapy, volume 2, Number 9, September 1952, page 441.

Welch et al.: Article in Antibiotics and Chemotherapy, December 1952, volume 2, Number 12, pages 693 to 696.

Bergey's Manual of Determinative Bacteriology (6th edition), Williams and Wilkins, Baltimore, 1948, page 938.